US012806926B2

(12) United States Patent
Yoshida

(10) Patent No.: US 12,806,926 B2
(45) Date of Patent: Nov. 24, 2026

(54) PRINTING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Teruyuki Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 18/819,495

(22) Filed: Aug. 29, 2024

(65) Prior Publication Data

US 2025/0074090 A1 Mar. 6, 2025

(30) Foreign Application Priority Data

Aug. 31, 2023 (JP) ................................ 2023-141558

(51) Int. Cl.
*B41J 25/304* (2006.01)
*B41J 2/155* (2006.01)
(Continued)

(52) U.S. Cl.
CPC ............. *B41J 25/304* (2013.01); *B41J 2/155* (2013.01); *B41J 2/2146* (2013.01); *B41J 15/048* (2013.01);
(Continued)

(58) Field of Classification Search
CPC ........ B41J 25/304; B41J 2/155; B41J 2/2146; B41J 15/048; B41J 29/00; B41J 29/393;
(Continued)

(56) References Cited

U.S. PATENT DOCUMENTS 8,733,869 B2 5/2014 Ohhashi
9,248,645 B1 2/2016 Mandel et al.
2008/0174816 A1* 7/2008 Inoue .................... G06F 3/1285 358/1.15

FOREIGN PATENT DOCUMENTS

JP 2001113683 A * 4/2001 ................ B41J 2/01
JP 2002-059559 A 2/2002
(Continued)

OTHER PUBLICATIONS

Extended European Search Report dated Dec. 23, 2024, in European Patent Application No. 24194894.2.
U.S. Appl. No. 18/819,557, Cho Ryo, filed Aug. 29, 2024.

*Primary Examiner* — Yaovi M Ameh
(74) *Attorney, Agent, or Firm* — Venable LLP

(57) ABSTRACT

A printing apparatus includes a moving unit configured to individually move a plurality of printheads provided for types of liquids between a printing position at which a liquid is discharged to a print medium and a retracted position retracted from the print medium as compared to the printing position, a conveying unit configured to convey the print medium, and a control unit configured to control the moving unit such that a printhead that discharges a liquid of a type to be used for printing among the plurality of printheads is located at the printing position, and a printhead that discharges a liquid of a type not to be used for printing is located at the retracted position. The control unit controls the moving unit to move a printhead of a moving target during conveyance of the print medium.

14 Claims, 11 Drawing Sheets

(51) Int. Cl.

| | |
|---|---|
| ***B41J 2/21*** | (2006.01) |
| ***B41J 15/04*** | (2006.01) |
| ***B41J 29/00*** | (2006.01) |
| ***B41J 29/393*** | (2006.01) |
| ***G06K 15/00*** | (2006.01) |
| ***G06K 15/10*** | (2006.01) |
| *B41J 2/07* | (2006.01) |
| *B41J 2/165* | (2006.01) |

(52) U.S. Cl.
CPC ............. *B41J 29/00* (2013.01); *B41J 29/393* (2013.01); *G06K 15/102* (2013.01); *G06K 15/407* (2013.01); *B41J 2/07* (2013.01); *B41J 2002/16573* (2013.01); *B41J 2/16585* (2013.01); *B41J 2/21* (2013.01); *B41J 2/2117* (2013.01)

(58) Field of Classification Search
CPC ... B41J 2/07; B41J 2/16585; B41J 2/21; B41J 2/2117; B41J 2002/16573; G06K 15/102; G06K 15/407
See application file for complete search history.

(56) References Cited

FOREIGN PATENT DOCUMENTS

| | | | | | | |
|---|---|---|---|---|---|---|
| JP | 2011201132 | A | * | 10/2011 | ............ | B41J 2/2114 |
| JP | 2016144937 | A | * | 8/2016 | ............ | B41J 25/308 |
| JP | 2020-168804 | A | | 10/2020 | | |
| JP | 2021-126524 | A | | 9/2021 | | |

* cited by examiner

| PAGE | CYAN | MAGENTA | YELLOW | BLACK | WHITE |
|---|---|---|---|---|---|
| 1 | ○ | × | ○ | ○ | × |
| 2 | ○ | × | × | ○ | × |
| 3 | ○ | × | ○ | ○ | × |
| 4 | ○ | × | × | ○ | × |
| ... | ... | ... | ... | ... | ... |
| 1000 | ○ | × | × | ○ | × |

| PRINTING SECTIONS | CYAN | MAGENTA | YELLOW | BLACK | WHITE |
|---|---|---|---|---|---|
| 0~100m | ○ | × | ○ | ○ | × |
| 100~200m | ○ | × | × | ○ | × |
| 200~300m | ○ | × | ○ | ○ | × |
| 300~400m | ○ | × | × | ○ | × |
| 400~420m | ○ | × | ○ | × | × |

FIG. 6A

SL

| TIME (SECONDS) | CONVEYANCE AMOUNT (m) | CYAN HEAD | MAGENTA HEAD | YELLOW HEAD | BLACK HEAD | FIXING PRIMER HEAD |
|---|---|---|---|---|---|---|
| INITIAL POSITIONS | — | PRINTING POSITION | RETRACTED POSITION | PRINTING POSITION | PRINTING POSITION | PRINTING POSITION |
| 150 | 100 | — | — | RETRACTED POSITION | — | — |
| 280 | 187 | — | — | PRINTING POSITION | — | — |
| 450 | 300 | — | — | RETRACTED POSITION | — | — |
| 580 | 387 | — | — | PRINTING POSITION | — | — |
| 630 | 420 | RETRACTED POSITION | — | RETRACTED POSITION | RETRACTED POSITION | RETRACTED POSITION |

FIG. 9A

SL

| TIME (SECONDS) | CONVEYANCE AMOUNT (m) | CYAN HEAD | MAGENTA HEAD | YELLOW HEAD | BLACK HEAD | FIXING PRIMER HEAD |
|---|---|---|---|---|---|---|
| INITIAL POSITIONS | — | PRINTING POSITION | RETRACTED POSITION | PRINTING POSITION | PRINTING POSITION | PRINTING POSITION |
| 150 | 100 | — | — | RETRACTED POSITION | — | — |
| 250 | 167 | — | — | PRINTING POSITION | — | — |
| 450 | 300 | — | — | RETRACTED POSITION | — | — |
| 550 | 367 | — | — | PRINTING POSITION | — | — |
| 630 | 420 | RETRACTED POSITION | — | RETRACTED POSITION | RETRACTED POSITION | RETRACTED POSITION |

PRINTING APPARATUS, CONTROL METHOD, AND NON-TRANSITORY COMPUTER-READABLE STORAGE MEDIUM

BACKGROUND OF THE INVENTION

Field of the Invention

The present invention relates to a printing apparatus.

Description of the Related Art

There is known a printing apparatus that prints an image by discharging ink from a printhead. In a printing apparatus including a plurality of printheads, there may be a printhead that need not discharge ink depending on an image to be printed or print settings. Japanese Patent Laid-Open No. 2002-59559 discloses a technique of moving color heads that need not discharge ink to a maintenance position when monochrome printing is selected.

In the technique of Japanese Patent Laid-Open No. 2002-59559, if color printing is selected, the color heads standby at a printing position. The color heads include a yellow head, a magenta head, and a cyan head. For example, even if cyan ink need not be discharged, the cyan head is made to stand by at the printing position. For this reason, the printing performance of the cyan head may be lowered.

SUMMARY OF THE INVENTION

The present invention provides a technique of preventing the printing performance of each printhead from lowering.

According to the present invention, there is provided a printing apparatus comprising: a moving unit configured to individually move a plurality of printheads provided for types of liquids between a printing position at which a liquid is discharged to a print medium and a retracted position retracted from the print medium as compared to the printing position; a conveying unit configured to convey the print medium; and a control unit configured to control the moving unit such that a printhead that discharges a liquid of a type to be used for printing among the plurality of printheads is located at the printing position, and a printhead that discharges a liquid of a type not to be used for printing is located at the retracted position, wherein the control unit controls the moving unit to move a printhead of a moving target during conveyance of the print medium.

Further features of the present invention will become apparent from the following description of exemplary embodiments (with reference to the attached drawings).

BRIEF DESCRIPTION OF THE DRAWINGS

FIG. 6A is a view showing an example of a moving schedule;

FIG. 9A is a view showing another example of the moving schedule; and

DESCRIPTION OF THE EMBODIMENTS

Figure 1:
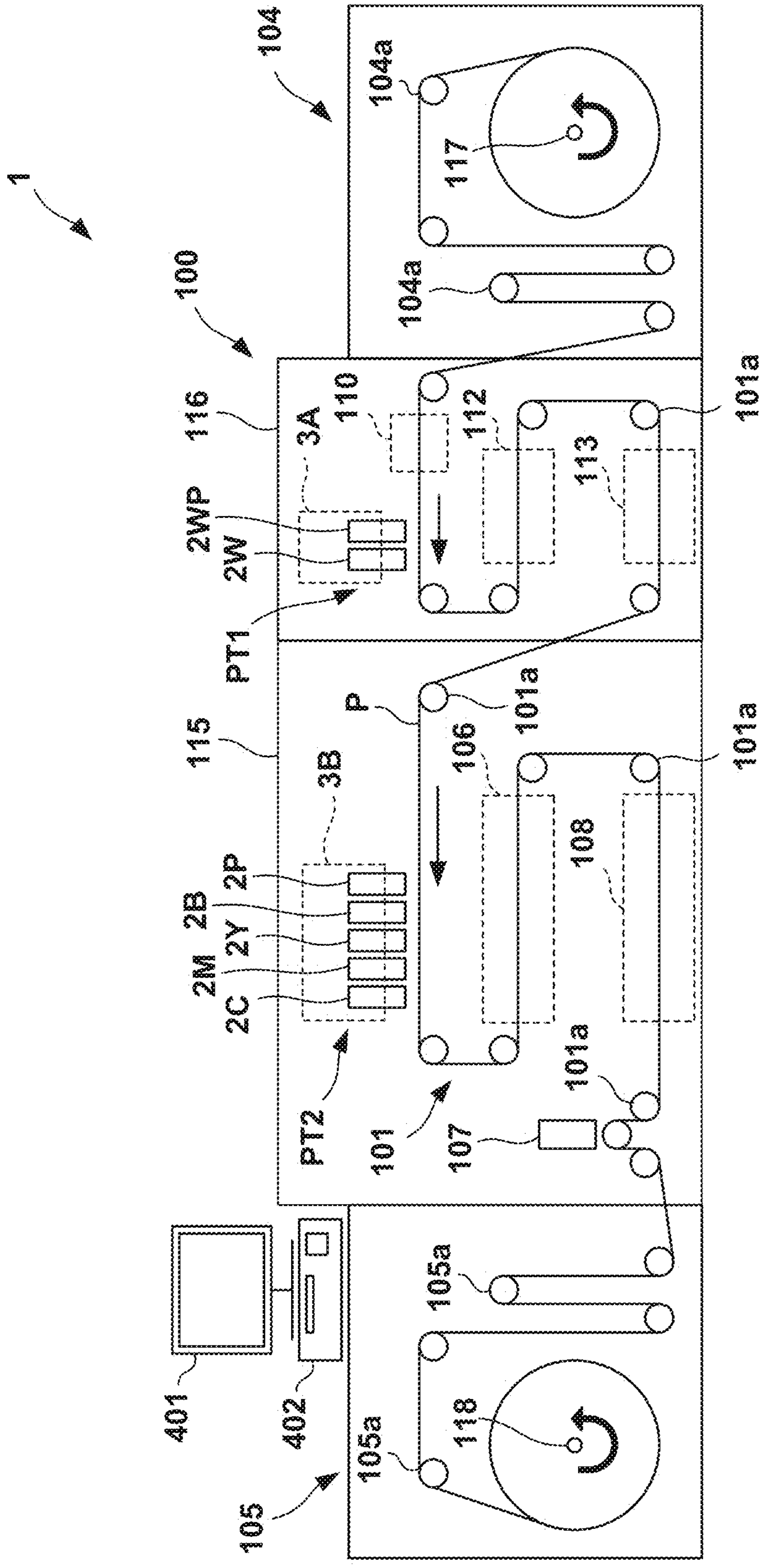
FIG. 1 is a schematic view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Configuration of Printing Apparatus

FIG. 1 is a schematic view of a printing apparatus 1 according to an embodiment of the present invention. The printing apparatus 1 is an apparatus that discharges liquid ink to a print medium P to print an image. Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium", cloth, a plastic film, and the like may also be used.

The printing apparatus 1 includes a feeding device 104, an image forming device 100, and a discharge device 105. In this embodiment, a continuous sheet (roll sheet) is used as the print medium P. The print medium P is sent from the feeding device 104 to the discharge device 105 via the image forming device 100. Note that the present invention is also applicable to a printing apparatus that prints an image on a cut sheet.

The feeding device 104 is a device that supplies the print medium P that is a roll sheet to the image forming device 100. The feeding device 104 pulls out the print medium P by rotating the rolled print medium P about a rotating shaft 117 and feeds the print medium P to the image forming device 100 at a predetermined speed via a plurality of conveyance rollers 104*a*. The print medium P is conveyed from the feeding device 104 to the image forming device 100 and the discharge device 105 in this order.

The discharge device 105 is a device that discharges, from the image forming device 100, the print medium P that is a product with a printed image. The discharge device 105 conveys the print medium P, which is conveyed from the image forming device 100, at a predetermined speed via a plurality of conveyance rollers 105*a*. The print medium P that is a product is wound in a roll by a rotating shaft 118 that rotates.

The image forming device 100 includes an additional printing device 115 and a preprinting device 116. A conveying device 101 includes a plurality of conveyance rollers 101*a*, and conveys the print medium P, which is fed from the feeding device 104, at a predetermined speed such that it passes through the preprinting device 116 and the additional printing device 115 in this order.

The preprinting device 116 performs spot color printing as preprinting. In spot color printing, for example, a base with a predetermined pattern is printed. The additional printing device 115 performs printing of basic colors as additional printing. In printing of basic colors, for example, a predetermined pattern or the like is printed. That is, it can be said that the printing apparatus 1 is a digital printing apparatus that performs preprinting and additional printing.

The preprinting device 116 includes a skew correction unit 110, a printing unit PT1, a drying unit 112, and a cooling unit 113, which are arranged sequentially from the upstream side in the conveyance direction of the print medium P. The skew correction unit 110 corrects skew of the print medium P. The printing unit PT1 includes a printhead 2WP, a printhead 2W, and a moving unit 3A. In this embodiment, the printhead 2W discharges white ink, and the printhead 2WP discharges primer ink for fixing. The printhead 2WP is located on the upstream side in the conveyance direction of the print medium P with respect to the printhead 2W. The moving unit 3A is a mechanism that moves the printhead 2WP and the printhead 2W individually between a printing position and a retracted position. The drying unit 112 heats the print medium P, thereby promoting drying of ink discharged to the print medium P. The cooling unit 113 cools the print medium P heated by the drying unit 112.

The additional printing device 115 includes a printing unit PT2, a drying unit 106, a cooling unit 108, and an inspection unit 107, which are arranged sequentially from the upstream side in the conveyance direction of the print medium P.

The printing unit PT2 includes a printhead 2P, a printhead 2B, a printhead 2Y, a printhead 2M, and a printhead 2C, which are arranged sequentially from the upstream side in the conveyance direction of the print medium P. In this embodiment, the printhead 2P discharges primer ink for fixing. The printhead 2B discharges black ink. The printhead 2Y discharges yellow ink. The printhead 2M discharges magenta ink. The printhead 2C discharges cyan ink. Also, the printing unit PT2 includes a moving unit 3B. The moving unit 3B is a mechanism that moves the printhead 2P, the printhead 2B, the printhead 2Y, the printhead 2M, and the printhead 2C individually between a printing position and a retracted position.

Note that when generally referring to the printheads 2WP, 2W, 2P, 2B, 2Y, 2M, and 2C or indicating an arbitrary printhead, it is sometimes called a printhead 2. When generally referring to the moving units 3A and 3B or indicating an arbitrary moving unit, it is sometimes called a moving unit 3.

The drying unit 106 heats the print medium P, thereby promoting drying of ink discharged to the print medium P. The cooling unit 108 cools the print medium P heated by the drying unit 106. The inspection unit 107 is a device that reads and inspects the image printed on the print medium P and includes, for example, a scanner device. Examples of inspection contents are inspection of color misalignment of the printed image, inspection of discharge failures of the printhead 2, and inspection of the tint of the printed image. These inspections may be performed by printing a test pattern on the print medium P by the printhead 2 and reading the test pattern by the inspection unit 107.

The printing apparatus 1 also includes an operation unit 401 and a control unit 402. The operation unit 401 accepts a user instruction. The control unit 402 is an electronic circuit (for example, a personal computer) that controls the printing apparatus 1.

Printhead and Moving Unit

The printhead 2 and the moving unit 3 will be described. The printhead 2 according to this embodiment is a full-line head and can discharge ink supplied from an ink tank (not shown) to the whole region of the print medium P in the widthwise direction. One printhead 2 discharges one type of ink. For example, the printhead 2B discharges only black ink. The preprinting device 116 is provided with two printheads, and the additional printing device 115 is provided with five printheads. That is, a total of seven printheads are provided. When printing basic colors, four or more printheads 2 (cyan, magenta, yellow, and black) suffice.

In the apparatus including the plurality of printheads 2, depending on the image to be printed, the printheads 2 that discharge ink and the printheads 2 that do not may occur during the printing operation. Vapor of water of the ink floats on the print medium P. If the vapor sticks to the printhead 2 that does not discharge ink, the printing performance thereof may lower. To prevent this, in this embodiment, the printheads 2 can be moved between the printing position and the retracted position by the moving unit 3.

Figure 2B:
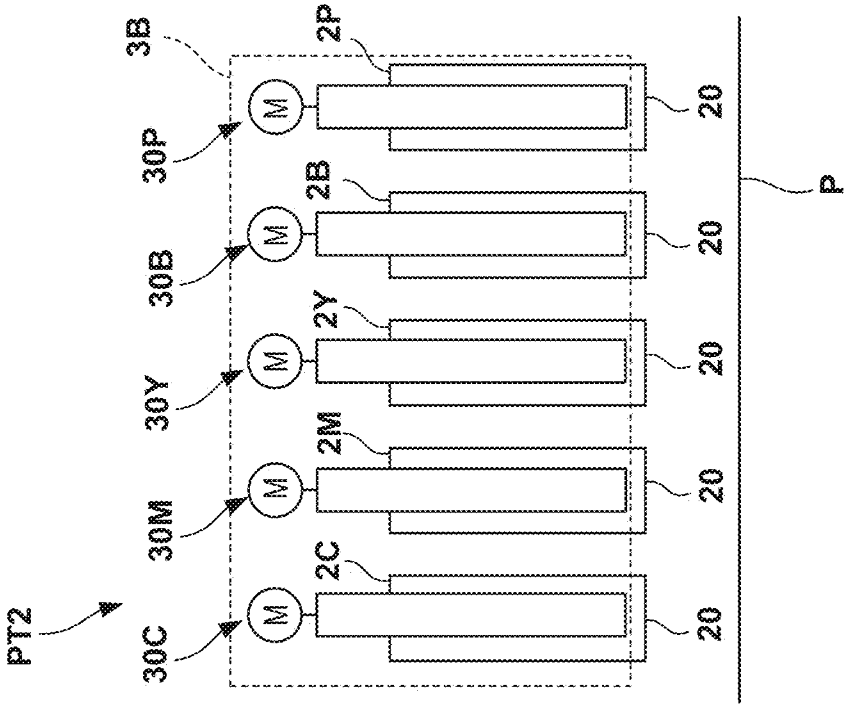
FIGS. 2A and 2B are explanatory views of a moving unit.
Figure 2A:
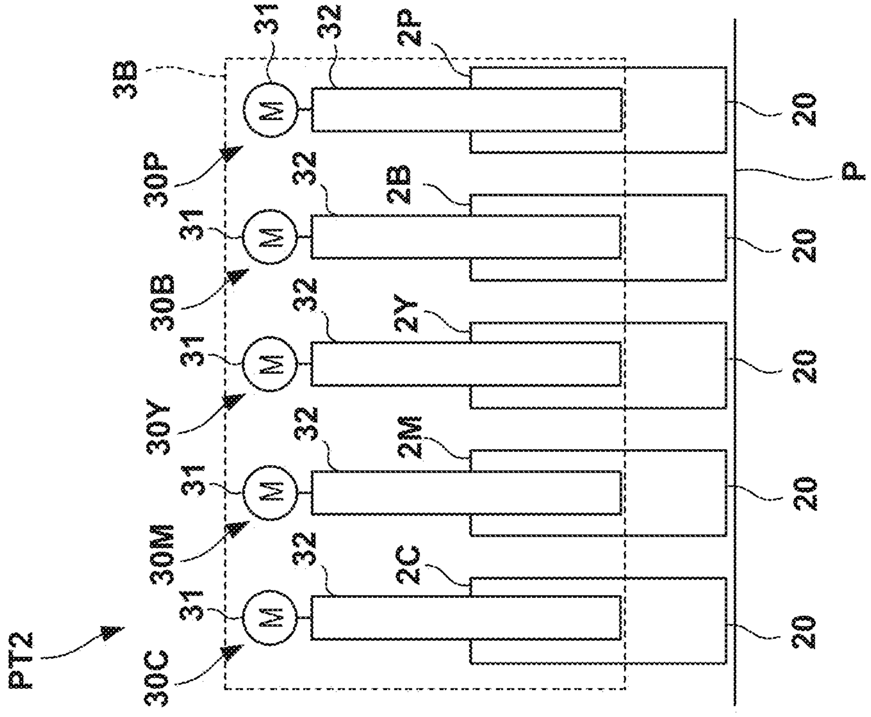

FIGS. 2A and 2B exemplarily show the configuration of the printing unit PT2. FIG. 2A shows a case where the printheads 2 are located at the printing position, and FIG. 2B shows a case where the printheads 2 are located at the retracted position. Each printhead 2 has a discharge surface 20 on its lower surface. The discharge surface 20 is provided with a plurality of nozzles configured to discharge ink. At the printing position, the discharge surface 20 faces close to the print medium P. At the retracted position, each printhead 2 is retracted from the print medium P as compared to the printing position. More specifically, the printhead 2 is separated from the print medium P as compared to the printing position, and a large gap exists between the discharge surface 20 and the print medium P. The retracted position is a position at which the vapor floating on the print medium P is difficult to stick to the discharge surface 20. Note that for the purpose of suppressing drying of the discharge surface 20, the discharge surface 20 may be capped by a cap member at the retracted position.

The moving unit 3B includes moving mechanisms 30P, 30B, 30Y, 30M, and 30C for the printheads 2. The moving mechanism 30P moves the printhead 2P. The moving mechanism 30B moves the printhead 2B. The moving mechanism 30Y moves the printhead 2Y. The moving mechanism 30M moves the printhead 2M. The moving mechanism 30C moves the printhead 2C. The moving mechanisms 30P, 30B, 30Y, 30M, and 30C each include a driving source 31 such as a motor, and an actuating mechanism 32 that moves the printhead 2 by the driving force of the driving source 31. The actuating mechanism 32 is, for example, a ball screw mechanism, a belt transmission mechanism, a link mechanism, or the like. In this embodiment, the actuating mechanism 32 raises/lowers the printhead 2 between the printing position on the lower side and the retracted position on the upper side.

The moving unit 3B is controlled to locate each printhead 2 that discharges ink to be used for printing at the printing position and each printhead 2 that discharges ink not to be used for printing at the retracted position, thereby performing a printing operation. When vapor is prevented from sticking to the printhead 2 that discharges ink not to be used for printing, the printing performance can be prevented from lowering. Note that although the printing unit PT2 is exemplarily shown in FIGS. 2A and 2B, the printheads 2W and 2WP and the moving unit 3A in the printing unit PT1 also have the same configurations.

Control Unit

Figure 3:
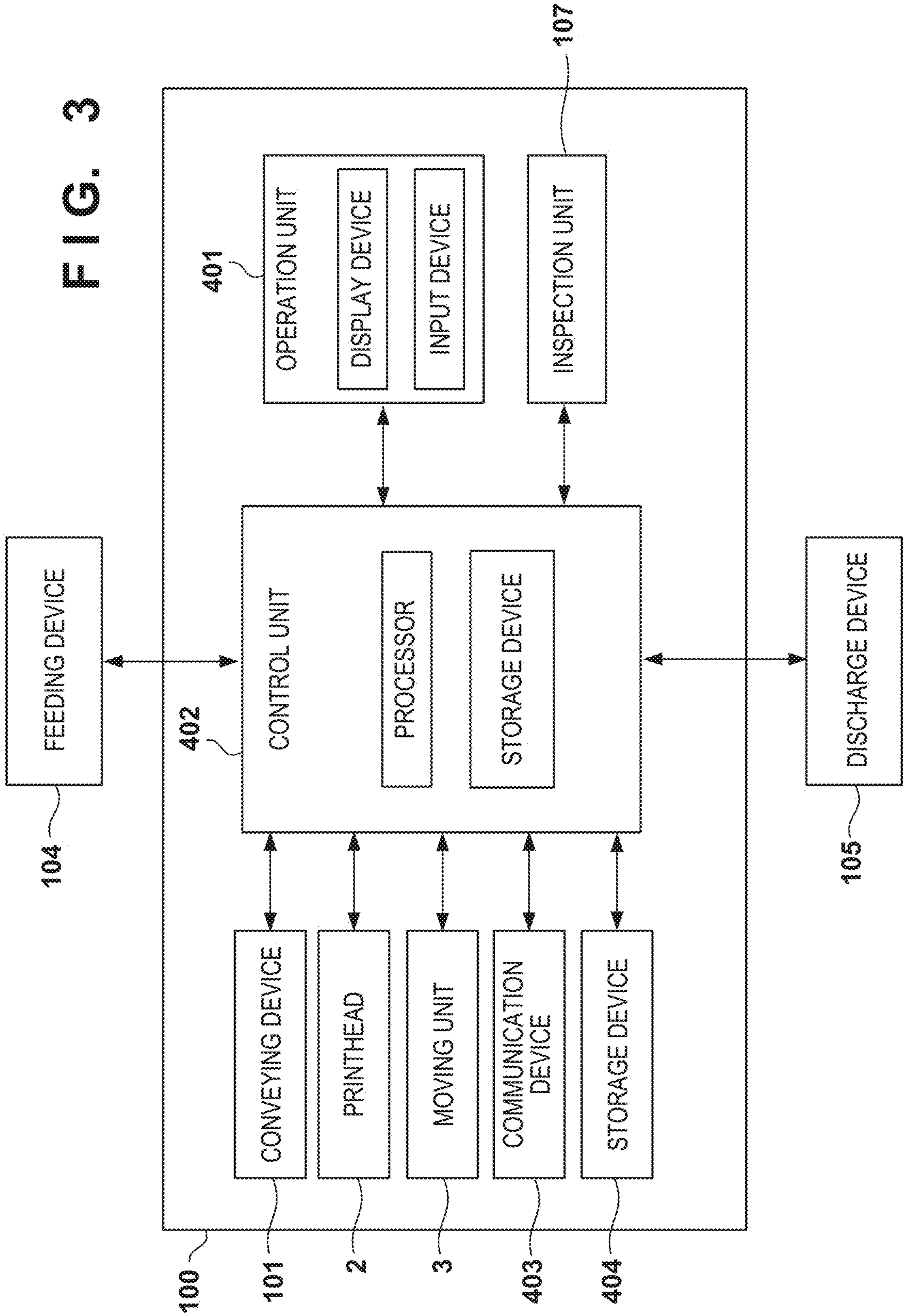
FIG. 3 is a block diagram of the control system of the printing apparatus shown in FIG. 1.

FIG. 3 is a block diagram of the control system of the printing apparatus 1. The control unit 402 includes a processor represented by a CPU, and a storage device. The storage device includes, for example, a plurality of semiconductor memories such as a RAM and a ROM. The processor executes a program deployed in the storage device, thereby controlling the printing apparatus 1. For example, the control unit 402 controls the conveying device 101, the printheads 2, the moving units 3, the inspection unit 107, the operation unit 401, the feeding device 104, and the discharge device 105.

A communication device 403 is formed by, for example, a communication control device such as a local area network (LAN) card. The communication device 403 receives a print job from, for example, an external device (for example, a user terminal), and the control unit 402 executes printing of the received print job.

A storage device 404 is an external storage device of the control unit 402, and is formed by, for example, a nonvolatile semiconductor memory (so-called flash memory), a hard disk drive (HDD), or the like. The storage device 404 can store various kinds of programs to be executed by the control unit 402 and various kinds of data necessary for execution of these programs.

The operation unit 401 is, for example, a touch panel, and includes a display device such as a liquid crystal display, and an input device that recognizes a touch operation. The display device displays various kinds of information on a display screen in accordance with a display control signal transmitted from the control unit 402. The input device accepts various kinds of input operations by the user via various kinds of operation keys such as buttons displayed on the display device, and transmits an operation signal to the control unit 402. The operation unit 401 is used, for example, by the user to set job information when executing a print job.

Procedure of Processing of Printing Apparatus

The procedure of processing of the printing apparatus 1 will be described. The print medium P is sent from the feeding device 104 to the discharge device 105 via the image forming device 100 in advance. The user creates preprint data (base data) and additional print data of a print job on, for example, the external device and sets printing conditions, thereby creating a print job. The print job is then transmitted to the control unit 402 via a communication network. If the user performs a start operation on the operation unit 401, the printing operation is started. The print medium P is conveyed at a predetermined speed, and ink is discharged from the printheads 2 onto the print medium P to print an image.

Movement Control of Printheads

Movement control of the printheads 2 by the moving unit 3 will be described. In this embodiment, the moving schedule of the printheads 2 is generated in advance, and after the start of the printing operation, the printheads 2 as the moving target are moved in accordance with the moving schedule.

Figure 4B:
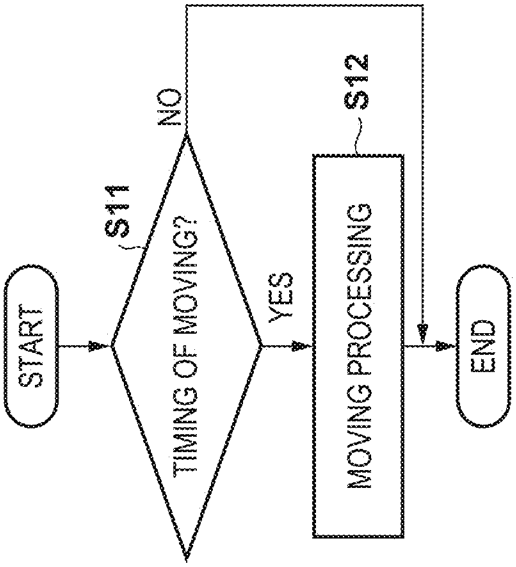
FIGS. 4A and 4B are flowcharts showing an example of processing executed by a control unit.
Figure 4A:
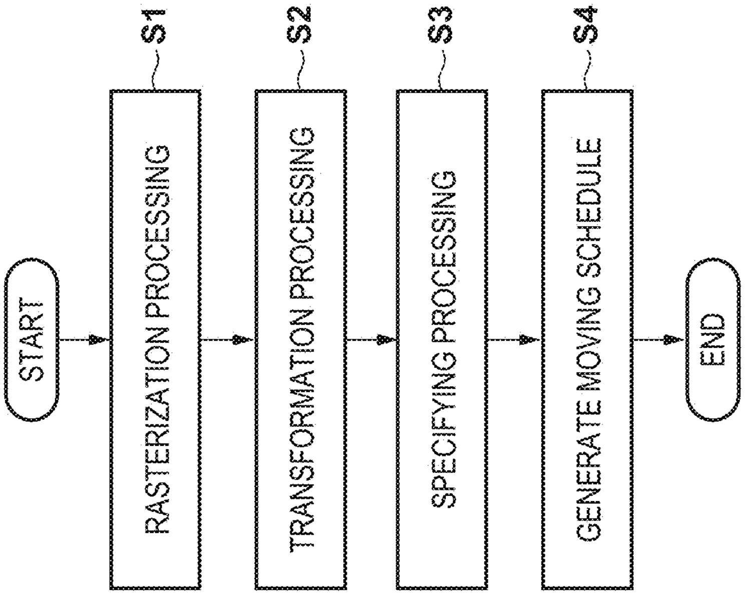

FIG. 4A is a flowchart showing an example of processing executed by the control unit 402, particularly, an example of moving schedule generation processing. This processing is started upon receiving a print job. Here, print data (image data) that is the target of printing in a print job is assumed to be data in the PDF format, but a data format such as TIFF or JPEG may be used.

In step S1, rasterization processing of print data of a received print job is executed. The print data in the PDF format is thus converted into print data in the raster file format. In step S2, image processing is performed for the print data in the raster file format, and data for each type of ink is generated on a page basis.

Based on the data for each type of ink generated in step S2, it is possible to specify types of inks to be used or not to be used. Note that specifying at least one of ink to be used and ink not to be used suffices. In step S3, based on the data generated in step S2, the types of inks to be used for printing and the types of inks not to be used for printing are specified for each page.

Figures 5A, 5B, 5C:
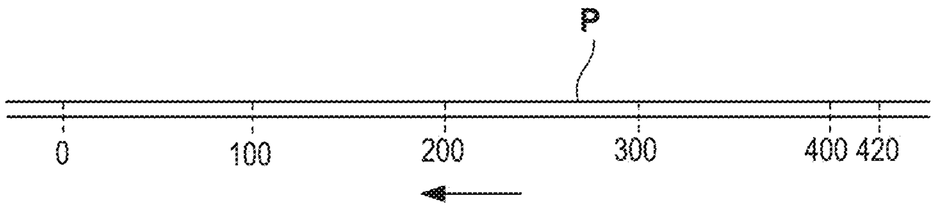
FIG. 5A is a view showing an example of a result of specifying types of inks for each page.
FIG. 5B is a view showing an example of printing sections of a print medium.
FIG. 5C is a view showing an example of a result of specifying types of inks for each printing section.

FIG. 5A shows an example of the specifying result, in which o indicates ink to be used for printing, and x indicates ink not to be used for printing. For example, for the first page, it is specified that cyan ink, yellow ink, and black ink are used, but magenta ink and white ink are not used. Also, for the 1000th page, it is specified that cyan ink and black ink are used, but magenta ink, yellow ink, and white ink are not used. This specifying result is stored in the storage device 404.

Note that the presence/absence of use of primer ink is not shown in FIG. 5A. This is because the presence/absence of use is determined by other types of inks. More specifically, as for primer ink to be discharged from the printhead 2P, it is used when one of cyan ink, yellow ink, and black ink is used, and not used if none are used. As for primer ink to be discharged from the printhead 2WP, it is used when white ink is used, and not used if white ink is not used.

In step S4 of FIG. 4A, a moving schedule is generated based on the specifying result in step S3. It is possible to determine, based on the information of the specifying result in FIG. 5A, whether each printhead 2 should be located at the printing position or the retracted position. On the other hand, time is taken to move the printheads 2. The printheads 2 may be moved on a page basis, but this may lower the efficiency of the printing operation. Hence, in this embodiment, a plurality of printing sections arranged in the conveyance direction are set on the print medium P, the printhead 2 that should be located at the printing position is specified for each printing section, and movement control of the printhead 2 is performed based on the specifying result.

FIG. 5B shows an example of setting of printing sections. The printing sections are set based on a unit length set in advance. In the example shown in FIG. 5B, assuming that one section has a length of 100 m in the conveyance direction of the print medium P, and five sections including a section from 0 to 100 m, a section from 100 to 200 m, a section from 200 to 300 m, a section from 300 to 400 m, and a section from 400 to 420 m are set. The last section from 400 to 420 m is a section shorter than 100 m because of the total number of pages of print data.

For example, assume that the length of each page of print data on the conveyance direction of the print medium P is 300 mm. The conveyance amount of the print medium P is 0.3 m in the first page, 0.6 m in the second page, 0.9 m in the third page, and 1.2 m in the fourth page. Images of about 333 pages are printed in the printing section of 100 m. If the total number of pages of the print data is 1,400, the total conveyance distance of the print medium P is 420 m.

In the processing of step S4, first, based on the information shown in FIG. 5A, types of inks to be used for printing and types of inks not to be used for printing are specified for each printing section. FIG. 5C shows an example. In the example shown in FIG. 5C, it is specified that, in the printing section from 0 to 100 m, cyan ink, yellow ink, and black ink are used, but magenta ink and white ink are not used. In other words, in the printing section from 0 to 100 m, there exists a page using one of cyan ink, yellow ink, and black ink, but a page using magenta ink and white ink does not exist. Also, it is specified that, in the printing section from 100 to 200 m, cyan ink and black ink are used, but magenta ink, yellow ink, and white ink are not used. In other words, in the printing section from 100 to 200 m, there exists a page using one of cyan ink and black ink, but a page using magenta ink, yellow ink, and white ink does not exist. This specifying result is stored in the storage device 404.

In the processing of step S4, next, a moving schedule is generated based on the specifying result shown in FIG. 5C. FIG. 6A shows an example, and shows an example of the moving schedule of the printheads 2P, 2B, 2Y, 2M, and 2C. Note that the same concept is used to generate the moving schedule of the printheads 2W and 2WP.

The moving schedule indicates timing of moving the printhead 2 during conveyance of the print medium P with respect to the time from the start of the printing operation as a reference. In the example shown in FIG. 6A, the conveyance speed of the print medium P is assumed to be 40 mpm (meter/min). Also, the moving time of the printhead 2 moving from the printing position to the retracted position and the moving time of the printhead 2 moving from the retracted position to the printing position are each assumed to be 20 sec. In FIG. 6A, "cyan head", "magenta head", "yellow head", "black head", and "fixing primer head" mean the printheads 2C, 2M, 2Y, 2B, 2P, 2W, and 2WP, respectively.

In this embodiment, the printhead 2 that discharges a type of ink to be used for printing in a certain printing section is located at the printing position at the start of the printing section. The printhead 2 that discharges a type of ink not to be used for printing in a certain printing section is located at the retracted position after the start of the printing section.

The contents of FIG. 6A will be described while referring to FIG. 5C. According to the example shown in FIG. 5C, the types of inks to be used in the printing section from 0 to 100 m are cyan, yellow, and black. As a result, primer ink is also used. For this reason, in the moving schedule shown in FIG. 6A, as for the initial positions of the printheads 2 at the start of printing, the printheads 2C, 2Y, 2B, and 2P are set to the printing position, and the printhead 2M is set to the retracted position. The printheads are moved to the initial positions until the start of printing and wait for the start of printing.

Next, according to the example shown in FIG. 5C, the types of inks to be used in the printing section from 100 to 200 m are cyan and black. As a result, primer ink is also used. Comparing the printing section from 0 to 100 m and the printing section from 100 to 200 m, only yellow is the type of ink whose presence/absence of use changes, and yellow changes from use to nonuse. For this reason, the moving schedule shown in FIG. 6A sets moving the printhead 2Y that discharges yellow ink to the retracted position at the timing of 150 sec (the timing at which the printing section from 0 to 100 m ends). The positions of the remaining printheads 2 do not change.

Figure 6B:
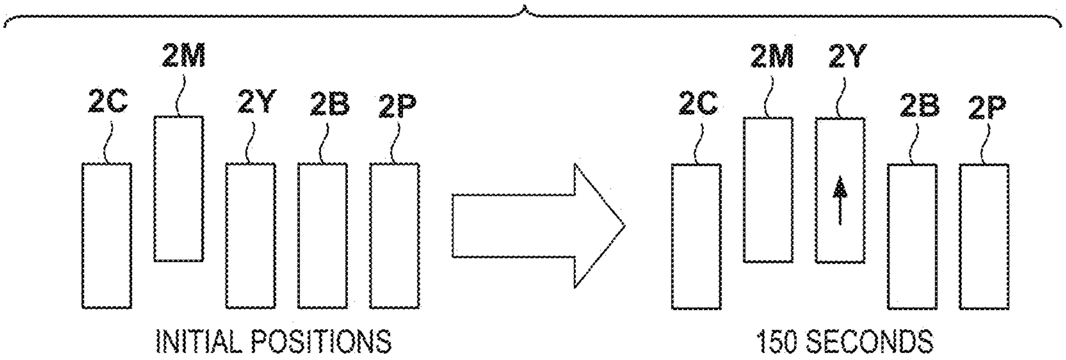
FIG. 6B is a view showing an example of movement of printheads.

FIG. 6B shows the initial positions and the change of the positions of the printheads 2 after 150 sec. Only the printhead 2Y moves from the printing position to the retracted position.

Next, according to the example shown in FIG. 5C, the types of inks to be used in the printing section from 200 to 300 m are cyan, yellow ink, and black. As a result, primer ink is also used. Comparing the printing section from 100 to 200 m and the printing section from 200 to 300 m, only yellow is the type of ink whose presence/absence of use changes, and yellow changes from nonuse to use. For this reason, the moving schedule shown in FIG. 6A sets moving the printhead 2Y that discharges yellow ink to the printing position at the timing of 280 sec (timing 20 sec before the timing at which the printing section from 100 to 200 m ends). The positions of the remaining printheads 2 do not change.

The moving schedule is generated in this way. The created moving schedule is stored in the storage device 404.

FIG. 4B shows an example of processing executed by the control unit 402, particularly, an example in which the moving unit 3 is controlled using the generated moving schedule. Based on the moving schedule read out from the storage device 404, the processing shown in FIG. 4B is repetitively executed during the printing operation.

In step S11, it is determined whether the moving timing of any printhead 2 has arrived. If there is the printhead 2 whose moving timing has arrived, the process advances to step S12. If such a printhead does not exist, the processing is ended. In step S12, moving processing is executed. Here, the moving unit 3 is controlled to move the printhead 2 whose moving timing has arrived to the printing position or the retracted position. The processing is thus ended.

Note that in this embodiment, the moving schedule from the first page to the last page is generated at once before the start of the printing operation. However, the moving schedule may be created while performing the printing operation. For example, a moving schedule corresponding to the printing section from 0 to 200 m may be generated first. The printing operation is started, and a moving schedule corresponding to the next printing section from 200 to 300 m may be generated before the printing section from 1 to 100 m ends.

Also, in this embodiment, the moving schedule is created after the specifying processing of step S3 is performed for all pages. However, these processes may be executed in parallel. In this case, the specifying processing of step S3 may not be performed for all pages. For example, if using all types of inks in the printing section from 0 to 100 m is defined in a section from 1 to 10 m, the specifying processing of step S3 can be omitted for pages corresponding to the remaining section from 10 to 100 m.

Second Embodiment

In the first embodiment, the unit length of the printing section is 100 m. The unit length may be changed in accordance with the conveyance speed of a print medium P. For example, if the conveyance speed is 10 mpm, the unit length may be 25 m. In addition, the length may be changed in accordance with the printing section. For example, the first printing section may be from 0 to 80 m, and the next printing section may be from 80 to 200 m.

The shortest distance of the printing section can be set in consideration of the moving time of a printhead 2. For example, if the time of moving the printhead 2 from the printing position to the retracted position is 20 sec, and the time of moving the printhead 2 from the retracted position to the printing position is also 20 sec, a time of 40 sec is necessary to move from the printing position to the retracted position and return to the printing position again. Hence, the distance in which the print medium P can be conveyed in 40 sec can be the shortest distance of the printing section.

Also, the printing section may be set for each type of ink. For example, for cyan ink, the first printing section may be from 0 to 80 m, and for magenta ink, the first printing section may be from 0 to 120 m.

Third Embodiment

An example of handling a case where a page is located across printing sections will be described. In the first embodiment, an example in which the length of each page in the conveyance direction of the print medium P is 300 mm, and the unit length of the printing section is 100 m has been described. In this case, images of about 333 pages are printed in the printing section of 100 m, and the image of the 334th page is located across the printing section from 0 to 100 m and the printing section from 100 to 200 m.

Here, assume that yellow ink is needed to print the image of the 334th page, and there is no other image that uses yellow ink in the printing section from 100 to 200 m. In this case, the timing of moving the printhead 2Y that discharges yellow ink to the retracted position may be delayed to timing after printing of the image of the 334th page.

Also, assume that yellow ink is needed to print the image of the 334th page, the yellow ink is needed in the printing section from 100 to 200 m as well, and there is no other image that uses yellow ink in the printing section from 0 to 100 m. In this case, the timing of moving the printhead 2Y that discharges yellow ink to the printing position may be advanced to timing before printing of the image of the 334th page.

Also, if there is a page located across the printing sections, the movement of the printhead 2 may be delayed or advanced uniformly by an amount corresponding to the page without confirming ink used in the page.

Fourth Embodiment

When repetitively printing the same print data, a moving schedule may be generated using information created at the time of first printing of the print data. This can shorten the processing time and reduce the operation load.

Figure 7A:
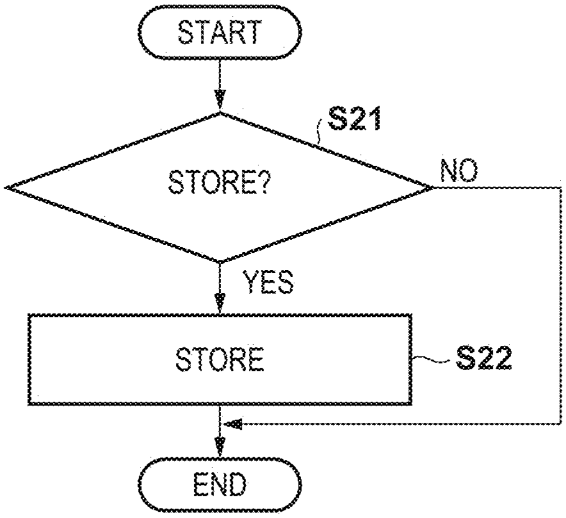
FIGS. 7A and 7B are flowcharts showing another example of processing executed by the control unit.

FIG. 7A shows an example of processing executed by the control unit 402, particularly, an example in which the result of the specifying processing of step S3 in FIG. 4A is stored. The example shown in FIG. 7A is executed, for example, after completion of execution of a print job.

In step S21, the presence/absence of storage is confirmed with the user. For example, display for inquiring about the presence/absence of storage is done on an operation unit 401. If the user selects storage, the process advances to step S22. In step S22, the result (information shown in FIG. 5A) of the specifying processing of step S3 in FIG. 4A is stored in a storage device 404 in association with print data. For example, the specifying result is stored as specifying information in association with a file name designated in the print job. The processing is thus ended.

Figure 7B:
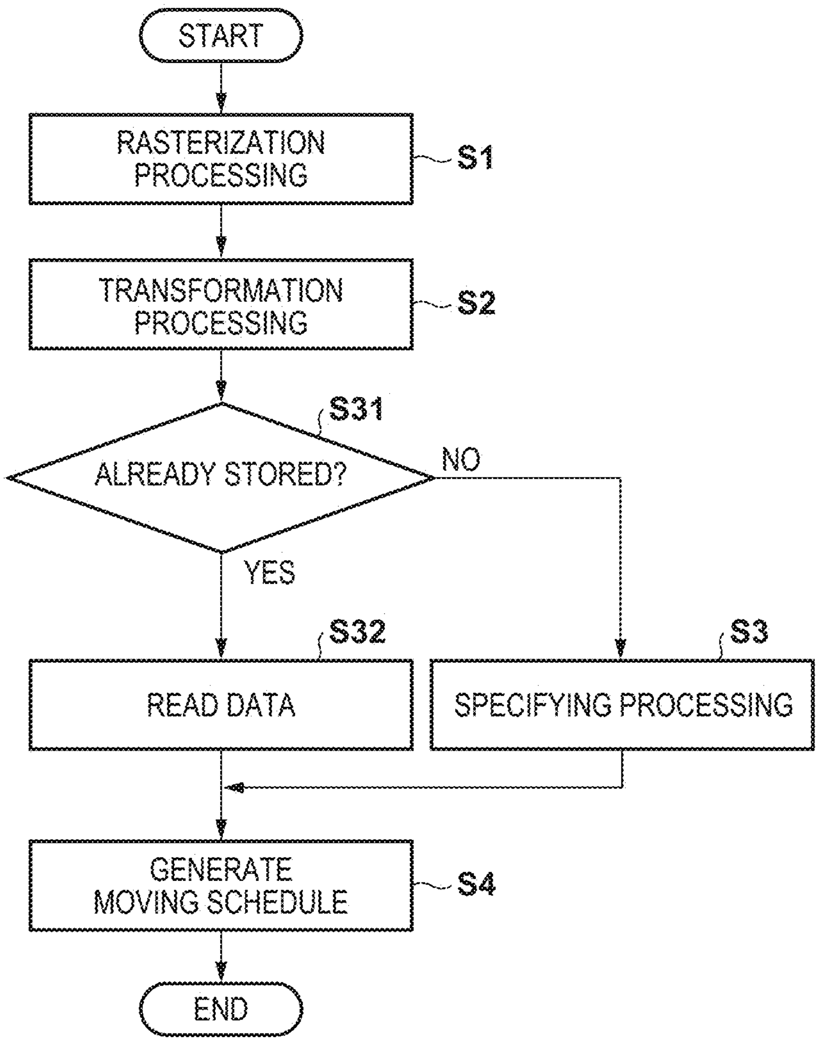

FIG. 7B shows an example of processing according to this embodiment, which replaces the example of processing shown in FIG. 4A. Processes different from FIG. 4A will be described below. After the processing of step S2, in step S31, printing contents in the storage device 404 are referred to, and it is determined whether specifying information is stored for the print data of the current print job. If the specifying information is stored, the specifying information is read out in step S32, and the processing of step S4 is executed. The specifying information created in the past can be used. If no specifying information is stored, the processing of step S4 is executed after the specifying processing of step S3.

Figure 8A:
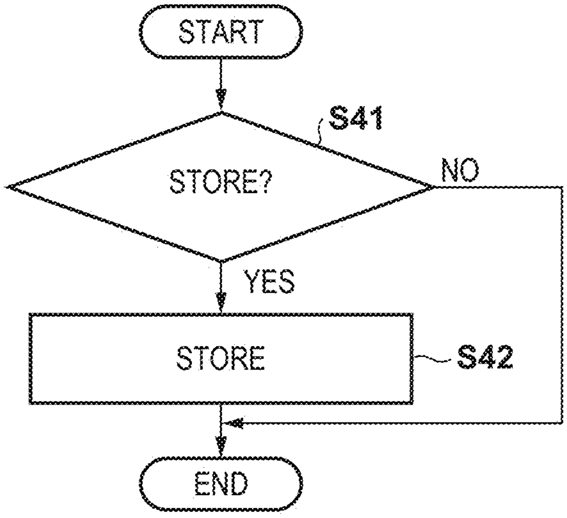
FIGS. 8A and 8B are flowcharts showing still another example of processing executed by the control unit.

It is also possible to use a moving schedule generated in the past. FIG. 8A shows an example of processing executed by a control unit 402, particularly, processing of storing a moving schedule generated in step S4 of FIG. 4A. The example shown in FIG. 8A is executed, for example, after completion of execution of a print job.

In step S41, the presence/absence of storage is confirmed with the user. For example, display for inquiring about the presence/absence of storage is done on the operation unit 401. If the user selects storage, the process advances to step S42. In step S42, a moving schedule generated in step S4 of FIG. 4A is stored in the storage device 404 in association with the print data. For example, the moving schedule is stored in association with a file name designated in the print job. The processing is thus ended.

Figure 8B:
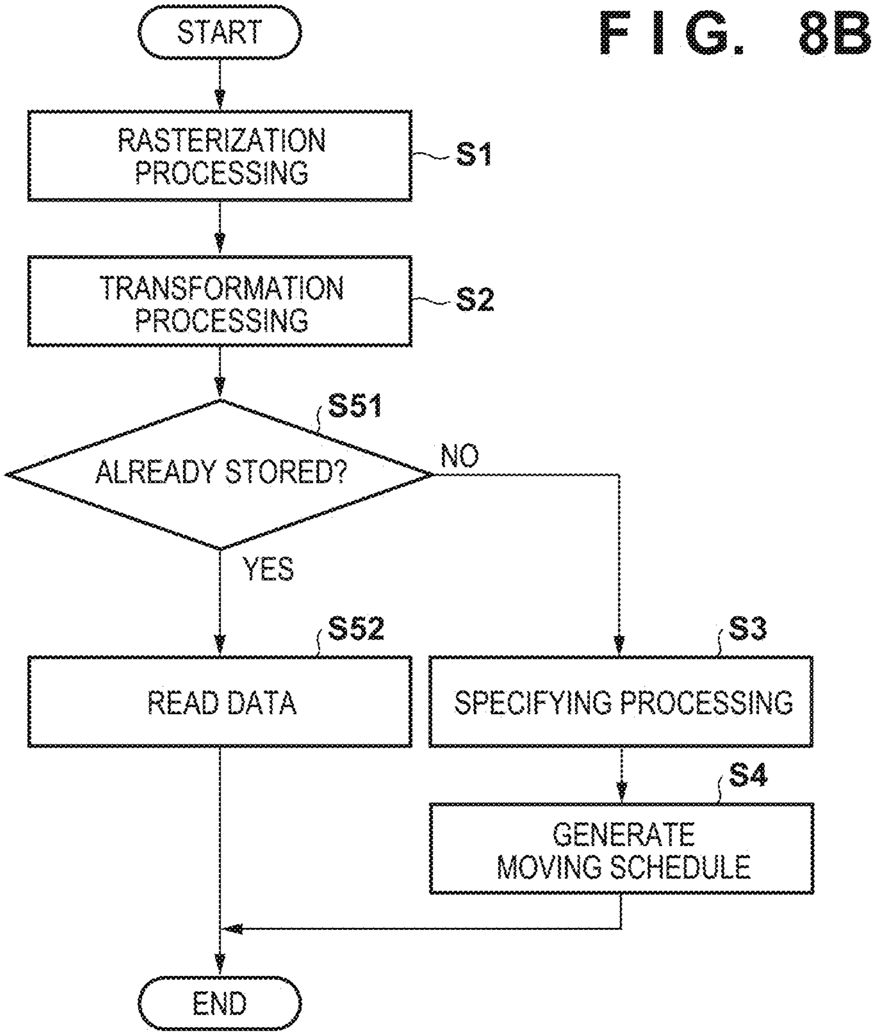

FIG. 8B shows an example of processing according to this embodiment, which replaces the example of processing shown in FIG. 4A. Processes different from FIG. 4A will be described below. After the processing of step S2, in step S51, printing contents in the storage device 404 are referred to, and it is determined whether a moving schedule is stored for the print data of the current print job. If the moving schedule is stored, the moving schedule is read out in step S52, and the processing is ended. The moving schedule created in the past can be used. If no moving schedule is stored, the processing of step S4 is executed after the specifying processing of step S3.

Note that in the examples shown in FIGS. 7A and 8A, the presence/absence of storage is confirmed with the user. However, information may be stored without inquiry with the user.

Fifth Embodiment

If time of keeping a printhead 2 located at the retracted position is long, nozzles may dry, and ink discharge performance may be low. To prevent this, if the printhead 2 is moved from the retracted position to the printing position, preliminary discharge of the printhead 2 may be performed.

FIG. 9A shows an example of a moving schedule generated in this embodiment based on the information shown in FIG. 5C. In the example shown in FIG. 9A, the conveyance speed of a print medium P is assumed to be 40 mpm (meter/min). Also, the moving time of the printhead 2 moving from the printing position to the retracted position and the moving time of the printhead 2 moving from the retracted position to the printing position are each assumed to be 20 sec. The time of the printhead 2 performing preliminary discharge at the printing position is assumed to be 30 sec.

The example shown in FIG. 9A is compared with the example shown in FIG. 6A. When moving the printhead 2 from the retracted position to the printing position, the timing of starting movement is advanced by 30 sec, that is, the time of preliminary discharge. For example, the timing of moving a printhead 2Y that discharges yellow ink from the retracted position to the printing position before the printing section from 100 to 200 m is the timing of 280 sec in the example shown in FIG. 6A but is the timing of 250 sec in the example shown in FIG. 9A. The time of preliminary discharge is ensured by starting movement 30 sec earlier.

Figure 9B:
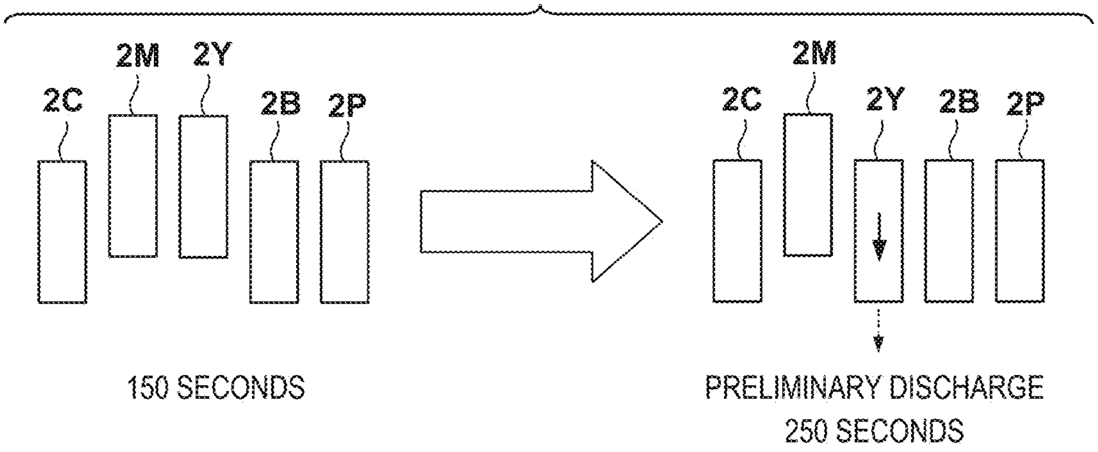
FIG. 9B is a view showing an example of movement and an example of the operation of the printheads.

FIG. 9B schematically shows an operation of performing preliminary discharge after the printhead 2Y that discharges yellow ink is moved from the retracted position to the printing position. In the preliminary discharge, for example, ink is discharged between pages on the print medium P. In a case of ink of an unnoticeable color, like yellow ink, preliminary discharge may be performed onto an image on the print medium P. Note that in this embodiment, preliminary discharge has been described as an example, but another maintenance such as color range adjustment during printing may be executed. When performing a plurality of maintenance operations, the moving schedule of the printhead 2 is set in consideration of time until all the operations are completed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-141558, filed Aug. 31, 2023, which is hereby incorporated by reference herein in its entirety.

What is claimed is:

1. A printing apparatus comprising:

a plurality of printheads provided for types of liquids;

a moving unit configured to individually move each of the plurality of printheads between a printing position at which a liquid is discharged to a print medium and a retracted position retracted from the print medium as compared to the printing position;

a conveying unit configured to convey the print medium; and a control unit configured to control the moving unit such that a printhead that discharges a liquid of a type to be used for printing among the plurality of printheads is located at the printing position, and a printhead that discharges a liquid of a type not to be used for printing among the plurality of printheads is located at the retracted position, wherein the control unit controls the moving unit to move a target printhead among the plurality of printheads during conveyance of the print medium, and the control unit controls the moving unit to start moving the target printhead from the retracted position to the printing position earlier in a case in which the target printhead performs a preliminary discharge than in a case in which the target printhead does not perform a preliminary discharge.

2. The apparatus according to claim 1, wherein the control unit specifies at least one of the type of the liquid to be used for printing and the type of the liquid not to be used for printing from print data that is a target of printing, and controls the moving unit based on a specifying result.

3. The apparatus according to claim 2, wherein the control unit specifies at least one of the type of the liquid to be used for printing and the type of the liquid not to be used for printing from the print data on a page basis.

4. The apparatus according to claim 2, wherein the control unit:

stores the specifying result in association with the print data, and uses the stored specifying result when printing print data identical to print data printed in the past.

5. The apparatus according to claim 1, wherein the control unit generates a moving schedule of the plurality of printheads and controls the moving unit in accordance with the moving schedule.

6. The apparatus according to claim 5, wherein the control unit:

stores the moving schedule in association with print data, and uses the stored moving schedule when printing print data identical to print data printed in the past.

7. The apparatus according to claim 1, wherein the control unit specifies at least one of the type of the liquid to be used for printing and the type of the liquid not to be used for printing for each of a plurality of printing sections arranged in a conveyance direction of the print medium, and sets a printhead to be moved and a moving timing based on a specifying result.

8. The apparatus according to claim 7, wherein each printing section has a length to print a plurality of pages.

9. The apparatus according to claim 7, wherein each printing section is a section set based on a unit length determined in advance.

10. The apparatus according to claim 1, wherein the print medium is a roll sheet.

11. The apparatus according to claim 1, wherein each printhead is a full-line head, and one type of liquid is assigned to one printhead.

12. The printing apparatus according to claim 1, wherein the plurality of printheads includes a plurality of color printheads configured to discharge color liquids; and at least one primer printhead configured to discharge a primer liquid for fixing, and the primer liquid is selectively used for printing based on a combination of types of color liquids to be used for printing.

13. A control method of a printing apparatus including a plurality of printheads provided for types of liquids, a moving unit configured to individually move each of the plurality of printheads between a printing position at which a liquid is discharged to a print medium and a retracted position retracted from the print medium as compared to the printing position, and a conveying unit configured to convey the print medium, the method comprising:

controlling the moving unit such that a printhead that discharges a liquid of a type to be used for printing among the plurality of printheads is located at the printing position, and a printhead that discharges a liquid of a type not to be used for printing among the plurality of printheads is located at the retracted position, wherein in the controlling, the moving unit is controlled to move a target printhead among the plurality of printheads during conveyance of the print medium, and in the controlling, the moving unit is controlled to start moving the target printhead from the retracted position to the printing position earlier in a case in which the target printhead performs a preliminary discharge than in a case in which the target printhead does not perform a preliminary discharge.

14. A non-transitory computer-readable storage medium storing a program configured to cause a computer to control a printing apparatus including a plurality of printheads provided for types of liquids, a moving unit configured to individually move each of the plurality of printheads between a printing position at which a liquid is discharged to a print medium and a retracted position retracted from the print medium as compared to the printing position, and a conveying unit configured to convey the print medium, by executing;

controlling the moving unit such that a printhead that discharges a liquid of a type to be used for printing among the plurality of printheads is located at the printing position, and a printhead that discharges a liquid of a type not to be used for printing among the plurality of printheads is located at the retracted position, wherein in the controlling, the moving unit is controlled to move a target printhead among the plurality of printheads during conveyance of the print medium, and in the controlling, the moving unit is controlled to start moving the target printhead from the retracted position to the printing position earlier in a case in which the target printhead performs a preliminary discharge than in a case in which the target printhead does not perform a preliminary discharge.

* * * * *